United States Patent [19]

St. Clair et al.

[11] Patent Number: 5,455,327

[45] Date of Patent: Oct. 3, 1995

[54] POLYIMIDES CONTAINING META-BIPHENYLENEDIOXY MOIETIES AND ARTICLES PREPARED THEREFROM

[75] Inventors: Terry L. St. Clair, Poquoson, Va.; J. Richard Pratt, Crossett, Ark.

[73] Assignee: The United States of America as represented by the United States National Aeronautics and Space Administration, Washington, D.C.

[21] Appl. No.: 169,885

[22] Filed: Dec. 16, 1993

Related U.S. Application Data

[63] Continuation of Ser. No. 62,861, May 13, 1993, abandoned.

[51] Int. Cl.⁶ .......................... C08G 69/26; C08G 73/10
[52] U.S. Cl. .................. 528/353; 528/125; 528/128; 528/170; 528/172; 528/173; 528/176; 528/183; 528/185; 528/188; 528/220; 528/229; 528/350; 524/600; 524/607; 428/411.1; 428/473.5; 106/287.32
[58] Field of Search ...................... 524/600, 607; 528/125, 128, 170, 172–173, 176, 183, 185, 188, 220, 229, 350, 353; 428/473.5, 411.1; 106/287.32

[56] References Cited

U.S. PATENT DOCUMENTS

| | | | |
|---|---|---|---|
| 4,094,862 | 6/1978 | Bell | 528/353 |
| 4,281,100 | 7/1981 | Takekoshi | 528/188 |
| 4,293,684 | 10/1981 | Takekoshi | 528/185 |
| 4,937,317 | 6/1990 | Pratt et al. | 528/173 |
| 5,116,939 | 5/1992 | Fletcher | 528/185 |
| 5,206,340 | 4/1993 | Tsutsumi et al. | 529/353 |
| 5,278,276 | 1/1994 | Ohta et al. | 528/185 |

*Primary Examiner*—P. Hampton-Hightower
*Attorney, Agent, or Firm*—George F. Helfrich; Joy L. Bryant

[57] ABSTRACT

Two monomers containing meta-biphenylenedioxy moieties were prepared. One monomer, a diamine, is used to prepare polyimide, polyamide, and epoxy polymers. The other monomer, a dianhydride, was used to prepare polyimide polymers. These polymers are used to make films, coatings, and selective membranes.

9 Claims, No Drawings

POLYIMIDES CONTAINING META-BIPHENYLENEDIOXY MOIETIES AND ARTICLES PREPARED THEREFROM

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

This is a continuation of copending application Ser. No. 08/062,861, filed on May 13, 1993, now abandoned.

BACKGROUND OF THE INVENTION

1. Field of the Invention

The present invention relates to compounds containing meta-biphenylenedioxy moieties. It relates particularly to diamines and dianhydrides which contain meta-biphenylenedioxy moieties.

2. Description of the Related Art

The need exists for high temperature polymers which can be processed into pads for aircraft and spacecraft and can withstand both highly oxidative and intense radiation environments. To be useful in the aerospace industry, polymers must be processable via thermoplastic means. This allows them to be formed or shaped into complex pads which may or may not contain reinforcements such as glass or graphite fibers.

Bell (U.S. Pat. No. 4,094,862) developed a method to prepare insoluble thermoplastic aromatic polyimides which have uniquely low softening temperatures. This method involved the reaction of an aromatic dianhydride with a meta-substituted aromatic diamine in a suitable solvent. The polymers formed from the meta-substituted diamines had glass transition (Tg) temperatures which were 50°–70° C. lower than their para-counterparts.

SUMMARY OF THE INVENTION

The incorporation of a meta-biphenylenedioxy unit into the backbone of the polymer allows for improved processing, increased flexibility, and enhanced thermal stability. The general structural formula of the meta-biphenylenedioxy compound Is given as:

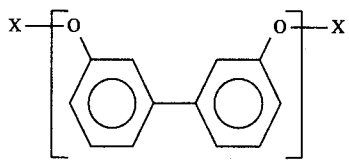

where x is either

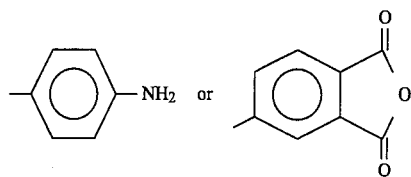

or a combination of the two.

The diamine structure allows for the formation of several additional polymers besides polyimides. These polymers include polyamides and epoxies. The incorporation of the meta-biphenylenedioxy moiety into the backbone of these polymers also increases flexibility.

Polyimides, polyamides, and epoxies containing meta-biphenylenedioxy moieties are used to make films, coatings, and selective membranes. The incorporation of more meta-biphenylenedioxy moieties into the polymer backbone allows for improved processing by lowering the glass transition (Tg) temperature by as much as 118° C. It also allows for increased flexibility in films and coatings and changes in membrane selectivity for passing gases such as oxygen, nitrogen, water vapor, and carbon dioxide.

An object of the present invention is to provide a diamine and a dianhydride which contain a meta-biphenylenedioxy moiety.

Another object of the present invention is to provide polyimide, polyamide, and epoxy polymers containing meta-biphenylenedioxy moieties.

Another object of the present invention is to prepare films, coatings, and selective membranes from polymers containing meta-biphenylenedioxy moieties.

DESCRIPTION OF THE PREFERRED EMBODIMENTS

The incorporation of meta-biphenylenedioxy moieties into the backbone of polymers allows for easier processing, increased flexibility, and enhanced thermal stability. In the present invention, both a diamine and a dianhydride which contain a meta-biphenylenedioxy linkage were prepared. The diamine was then used to prepare polyimide polymers and is used to prepare polyamide and epoxy polymers having the following general structural repeat unit:

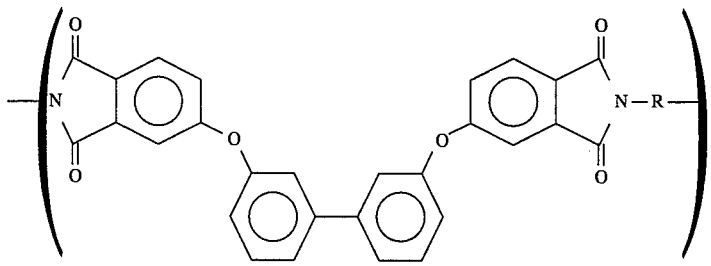

where R is any aliphatic or aromatic hydrocarbon unit. The dianhydride was used to prepare polyimide polymers.

The effectiveness of the incorporation of meta-biphenylenedioxy linkages into polyimides was demonstrated when compared to polyimides which contained para-biphenoxy linkages. The glass transition (Tg) temperatures were 25°–118° C. lower for the meta-biphenylenedioxy containing polyimides. This reduction in the Tg allows for easier processing at lower temperatures. Films which were made from these compounds were found to have greater flexibility than their para-counterparts. This was demonstrated by their ability to be creased without breaking.

EXAMPLES

Example 1

The 3,3'-biphenol (0.0447 mole, 8.3327 g) was dissolved in 25 ml of dimethylsulfoxide (DMSO). This solution was heated to reflux and sodium hydroxide (NaOH) (50.8% in water) (0.0894 mole, 7.0470 g) was added to form the disodium salt. Next, 30 ml more of DMSO were added along with 160 ml of toluene. The water was removed from the reaction azeotropically to allow for the formation of the disodium salt. After the formation of the disodium salt, 1,4-dinitrobenzene (0.0894 mole, 15.0455 g) was slowly added. The nitro displacement reaction occurred with a very small exotherm. The reaction was heated for an additional hour at 155°–160° C. and allowed to cool overnight. A precipitate was isolated, washed with water and dried in the air. This dinitro product was recrystallized and reduced to the corresponding diamine using excess hydrazine hydrate (palladium on charcoal catalysis). The diamine product (3,3'-BAPB) was in the form of near colorless platelets with a sharp melting point centering at 124° C. The structural formula for this diamine is given below:

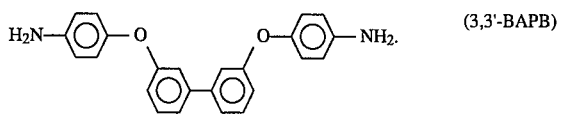

(3,3'-BAPB)

Example 2

The reaction of stoichiometric amounts of 3,3',4,4'-benzophenonetetracarboxylic dianhydride and 3,3'-BAPB was carried out at approximately 23° C. in N,N-dimethylacetamide (DMAc) at 15% solids. A polymeric solution was formed which had an inherent viscosity of 0.68 dL/g. The solution was cast onto a glass plate and doctored to a wet film thickness of approximately 0.015 inches. The film was allowed to dry in a dry box overnight and was cured for 1 hour each at 100°, 200°, and 300° C. in a forced air oven. The remaining polyimide film coating was approximately 0.001 inch and was removed from the glass plate by soaking in warm water. This film had a Tg of 235° C. The resulting polyimide had the following structural repeat unit:

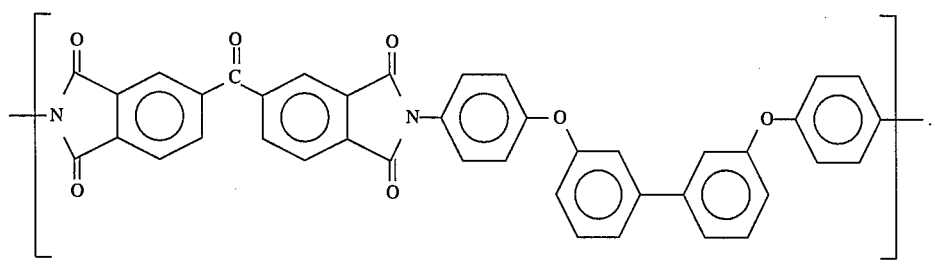

Example 3

The procedure of Example 2 was used to prepare a polyimide film from stoichiometric quantities of 4,4'-oxydiphthalic anhydride and 3,3'-BAPB. The polymer solution had an inherent viscosity of 0.74 dL/g. The resulting film was approximately 0.001 inch thick, was yellow/gold in color and had a Tg of 210° C. The structural repeat unit of this polyimide is shown below:

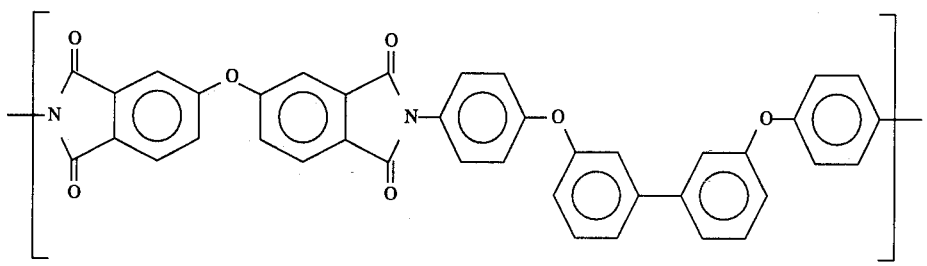

Example 4

The procedure of Example 2 was used to prepare a polyimide film from stoichiometric quantities of 4,4'-(4,4-biphenylenedioxy)diphthalic anhydride and 3,3'-BAPB. The polymeric solution had an inherent viscosity of 0.90 dL/g. The resulting polyimide film was a nominal 0.001 inch thick, was yellow/brown in color, and had a Tg of 202° C. which was significantly lower than its para-counterpart which had a Tg of 300° C. The resulting polyimide film had the following structural repeat unit:

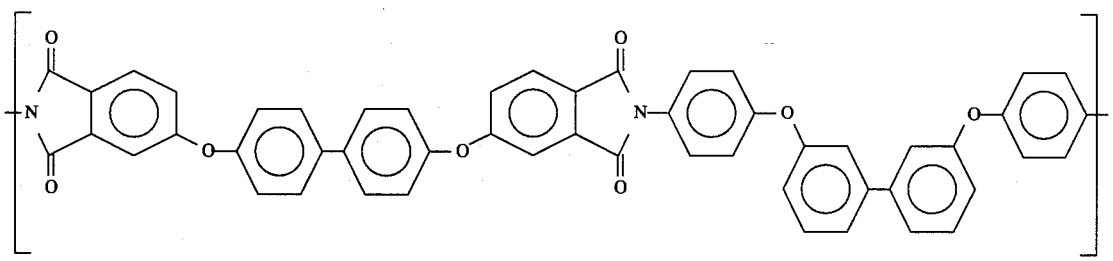

Example 5

A polyamide film is prepared by teaching stoichiometric amounts of terephthaloylchloride and 3,3'-BAPB in DMAc. A thin film of this solution is cast and is cured to 200°C. The resulting polyamide film has the following structural repeat unit:

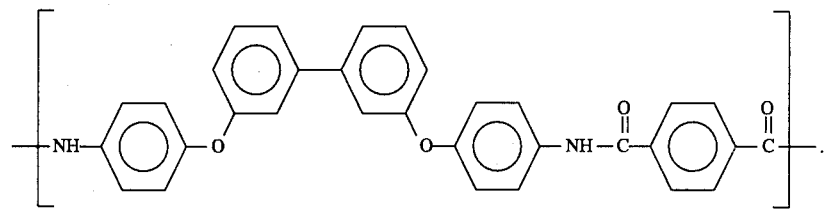

Although terephthaloylchloride is used to form the polyamide, other acid chlorides known to those skilled in the art may also be used to give the following general structural repeat unit:

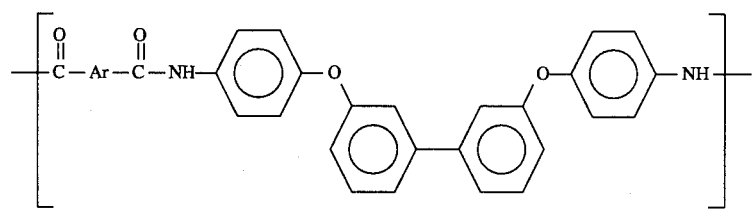

where Ar is any aromatic moiety.

Example 6

An epoxy film is prepared by mixing stoichiometric amounts of an epoxy resin and 3,3'-BAPB. The mixture is warmed to > 125° C. on a hot plate and a cured crosslinked epoxy resin film results. The initial reaction yields an epoxy resin having the following general structural repeat unit:

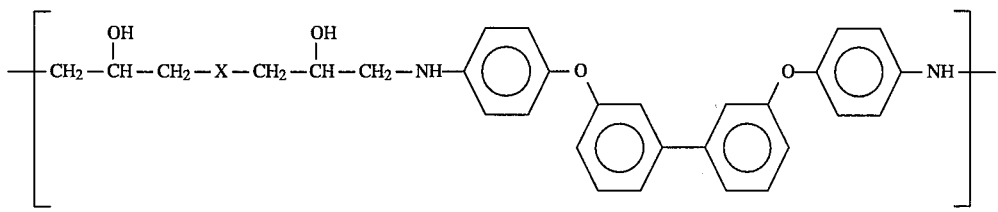

where x is any aromatic moiety, and further reactions occur leading to a crosslinked film.

Example 7

The reaction of 3,3'-biphenol (5.48 g, 0.0294 mol) with 50.7% aqueous sodium hydroxide (NaOH) (4.64 g, 0.0588 mol) in 25 ml DMSO followed by removal of the water as a toluene azeotrope yielded the disodium salt of this bisphenol. 4-Nitro-N-ethylphthalimide (13.0 g, 0.0588 mol) was added and the mixture was heated for 1 hour at 105°–106° C. After cooling, the resulting tan solid was washed by pouring it into water in a blender and then filtering. After two additional washings, the solid was vacuum dried at 140°. The yield of the bisimide was 15.0 g (95.6%), m.p. 167° C. by Differential Thermal Analysis (DTA) maximum.

Anal.: Calcd. for $C_{32}H_{24}N_2O_6$: C, 72.17%; H, 4.54%; N, 5.26%. Found: C, 72.23%; H, 4.66%; N, 5.16%.

Hydrolysis of the bisimide with aqueous NaOH for 25 hours followed by acidification with concentrated hydrochloric acid (HCl) formed the tetracarboxylic acid. The product was formed by cyclodehydration in refluxing acetic anhydride/toluene for 2 hours. This product was recrystallized from toluene and dried to give 4,4'-(3,3'-biphenylenedioxy)diphthalic anhydride (4,3,3,4-BDODA), m.p. 204° C. (DTA max.).

Anal.: Calcal. for $C_{28}H_{14}O_8$; C, 70.30%; H, 2.95%. Found: C, 70.85%; H, 3.10%.

The dianhydride, 4,3,3,4-BDODA, has the following structural formula:

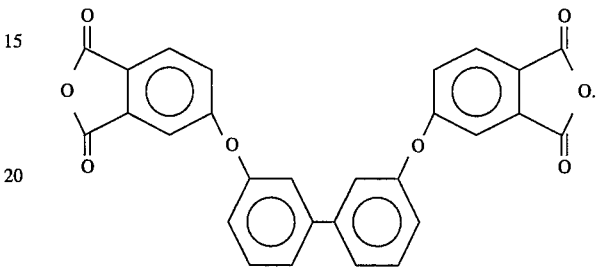

Example 8

The overnight reaction of 4,3,3,4-BDODA (0.300 g, $6.27 \times 10^{-4}$ mol) with 4,4'-oxydianiline (ODA) (0.126 g, $6.27 \times 10^{-4}$ mol) in 1.71 g of N,N-dimethylacelamide (DMAc) at 25° C. to make the solids content 20% afforded a poly(amic acid) solution with an inherent viscosity of 0.62 dL/g at 35° C. in DMAc. A 20 mil thick film of lifts solution was cast on soda-lime glass, dried overnight in a dry box, and cured for 1 hour each at 100% 200% and 300° C. The resulting creasable film had a glass transition temperature of 209° C. by differential scanning calorimetry (DSC) as compared to 243° C. for the para-counterpart. The film was insoluble in refluxing methylene chloride, DMAc, and m-cresol. The film showed no evidence of semi-crystallinity by DSC or wide angle x-ray scattering (WAXS). The resulting polyimide film had the following structural repeat unit:

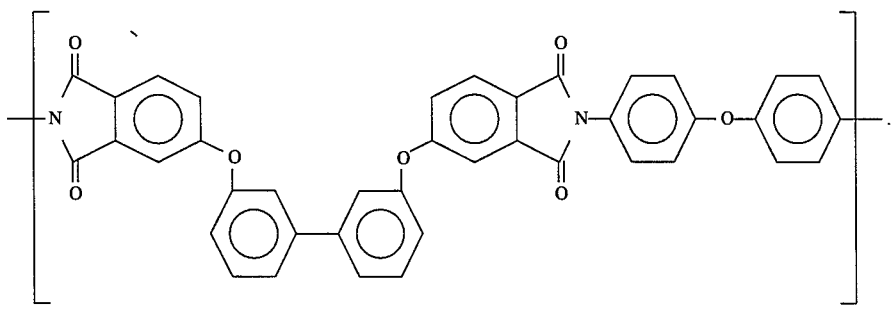

Example 9

4,3,3,4-BDODA was reacted with a stoichiometric amount of 1,3-phenylenediamine in DMAc to yield a 20% solids poly(amic acid) solution as in Example 8. The solution had an inherent viscosity of 0.44 dL/g. A 20 mil thick film of this solution was cast on soda lime glass, dried, and cured as in Example 8. The resulting creasable film was amorphous by DSC and had a Tg of 215° C. as compared to 255° C. for the para-counterpart. The film was soluble in hot DMAc (but precipitated on standing at 25° C. for 2 days) and insoluble in hot methylene chloride and m-cresol. The structural repeat unit for this polyimide is given below:

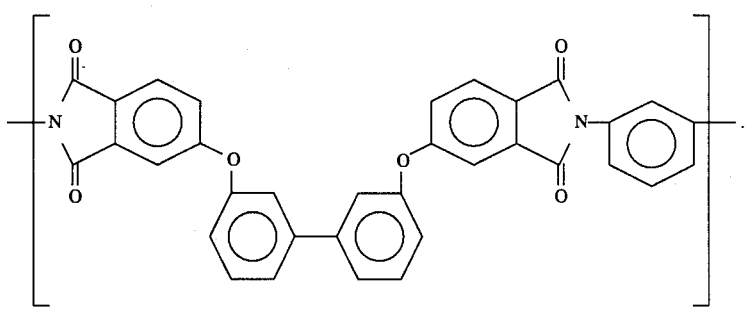

Example 10

4,3,3,4-BDODA was reacted with a stoichiometric amount of 1,4-phenylenediamine as in Example 8. The resulting poly(amic acid) solution had an inherent viscosity of 0.53 dL/g. A 20 mil thick solution was cast on soda-lime glass, dried, and cured as in Example 8. The film was creasable, translucent, and insoluble in refluxing dichloromethane, DMAc, and m-cresol. The polyimide had a crystalline melting point of 346° C. by DSC and has the following structural repeat unit:

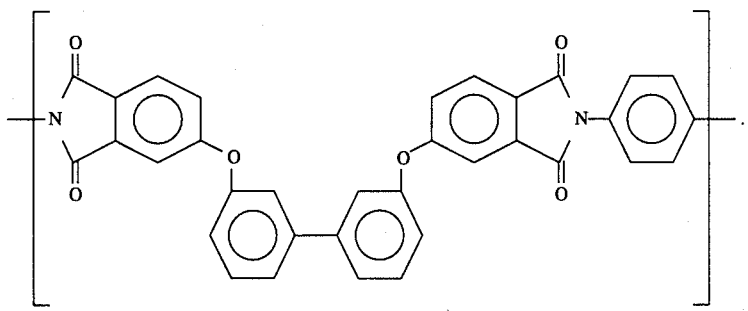

Example 11

Stoichiometric amounts of 4,3,3,4-BDODA and 4,4'-bis(4'-aminophenoxy)biphenyl were reacted in DMAc as in Example 8. The resulting poly(amic acid) solution had an inherent viscosity of 0.99 dL/g. A film was cast, dried, and cured as in Example 8. The resulting creasable film had a Tg of 190° C. as compared to 300° C. for its para-counterpart. There was no semi-crystallinity by DSC or WAXS. The polyimide film was insoluble in refluxing dichloromethane, DMAc, and m-cresol. The structural repeat unit for this polyimide is shown below:

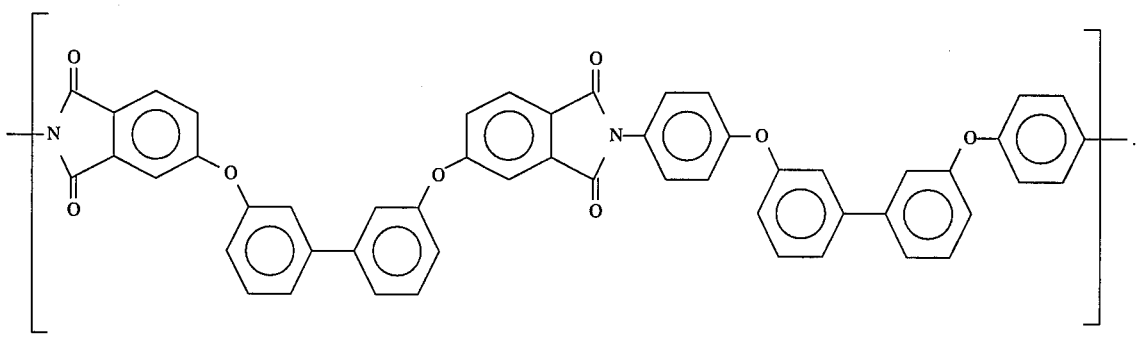

Example 12

Stoichiometric amounts of 4,3,3,4-BDODA and 4,4'-bis(3'-aminophenoxy)biphenol were reacted in DMAc as in Example 8. The poly(amic acid) solution had an inherent viscosity of 0.55 dL/g. A film was cast, dried, and cured as in Example 8. The film was creasable and insoluble in refluxing dichloromethane and m-cresol and soluble in refluxing DMAc. The polyimide had a Tg of 172° C. as compared to its para-counterpart of 212° C. The structural repeat unit of this polyimide is shown below:

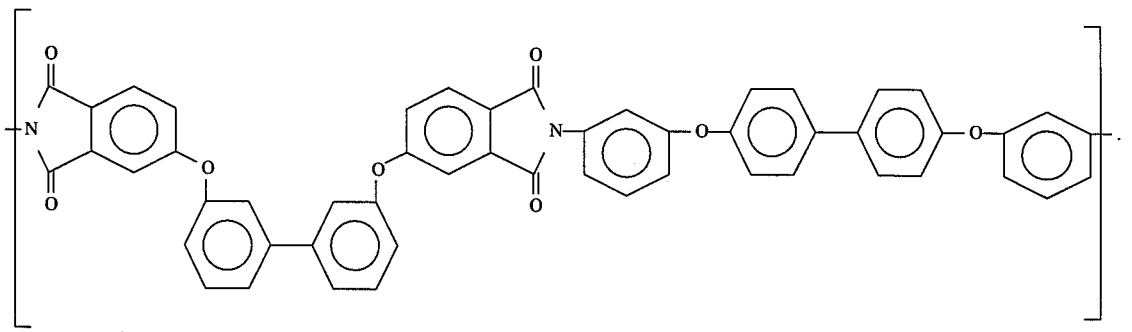

Example 13

Stoichiometric quantities of 4,3,3,4-BDODA and 3,3'-BAPB were reacted as in Example 2. The resulting poly(amic acid) solution had an inherent viscosity of 0.66 dL/g. A film was cast, dried, and cured as in Example 8. The resulting polyimide film had a Tg of 202° C. as compared to 300° C. for its para-counterpart. The structural repeat unit for this polyimide is given below:

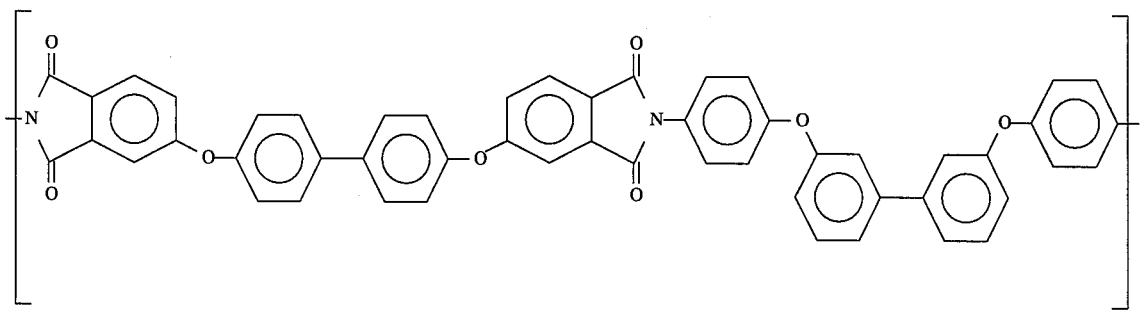

Example 14

A wire coating is prepared with the poly(amic acid) solution of Example 13 by immersing a piece of wire into the solution. Upon removal from the solution, the coating is allowed to air dry. After drying, the wire is placed in an air oven and cured for 1 hour each at 100°, 200°, and 300° C. to form the coating. Although the solution of Example 13 is used to make a polyimide coating, solutions of the polyamide and epoxy polymers can also be used.

Example 15

A selective membrane is prepared from the poly(amic acid) solution of Example 13. The solution is coated onto a piece of plate glass. Next, the DMAc is allowed to evaporate at room temperature. The remainder of the DMAc is leached from the film by immersing it in methanol to form a membrane which is subsequently thermally treated to form a stable selective membrane. Although the polyimide solution of Example 13 is used to make the membrane, solutions of the polyamide and epoxy polymers can also be used.

The foregoing specific examples are exemplary and are not to be considered as exhaustive, but merely to illustrate the invention without serving as limitations thereon.

What is claimed as new and desired to be secured by Letters Patent of the United States is:

1. A polymer prepared from a meta-biphenylenedioxy compound having the structural formula:

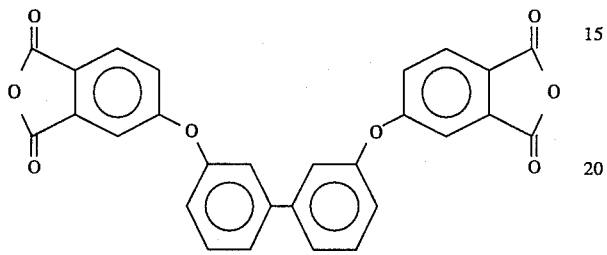

wherein the polymer has the following repeat unit:

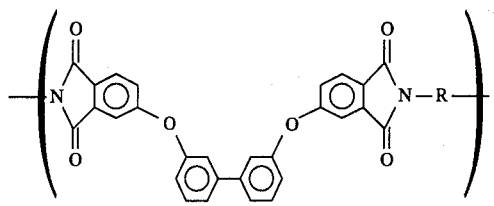

where R is any aliphatic or aromatic hydrocarbon unit.

2. A polymer according to claim 1, having the repeat unit:

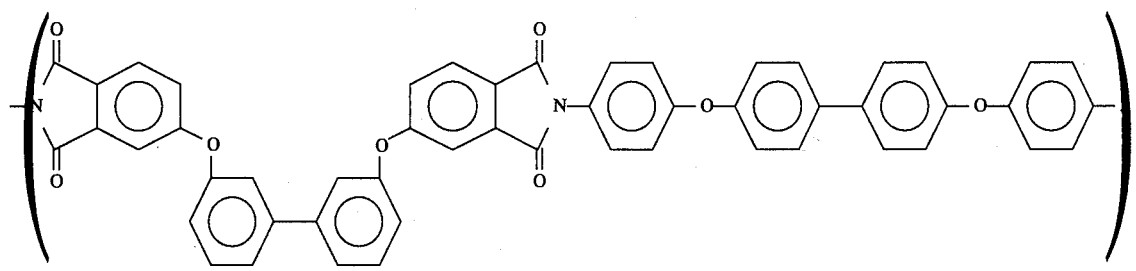

3. A polymer according to claim 1, having the repeat unit:

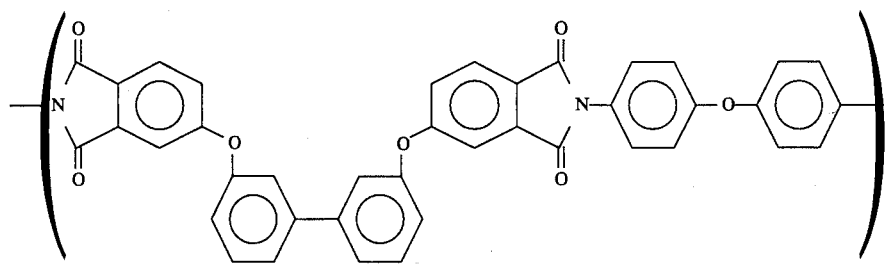

4. A polymer according to claim 1, having the repeat unit:

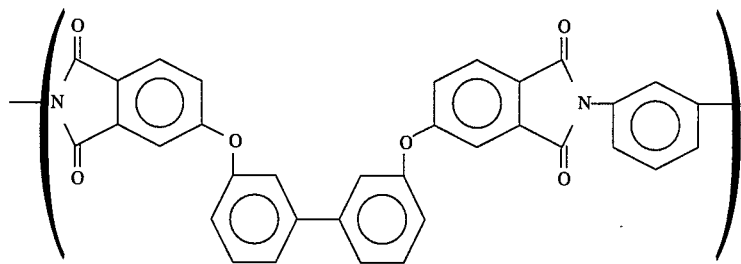
5. A polymer according to claim 1, having the repeat unit:
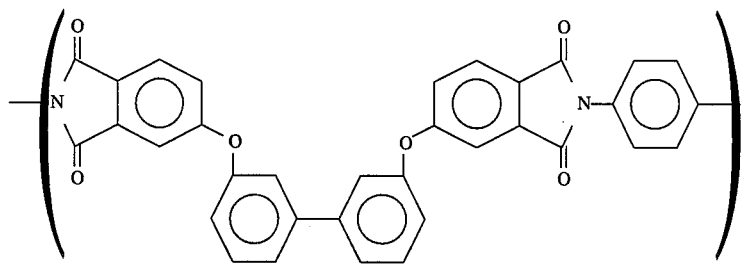
6. A polymer according to claim 1, having the repeat unit:
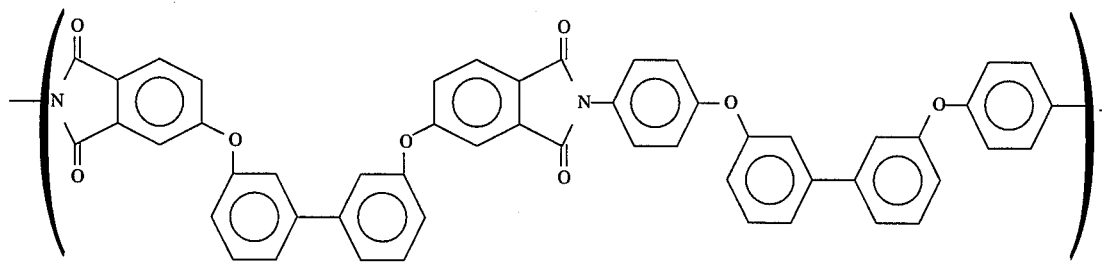
7. A polymer according to claim 1, having the repeat unit:
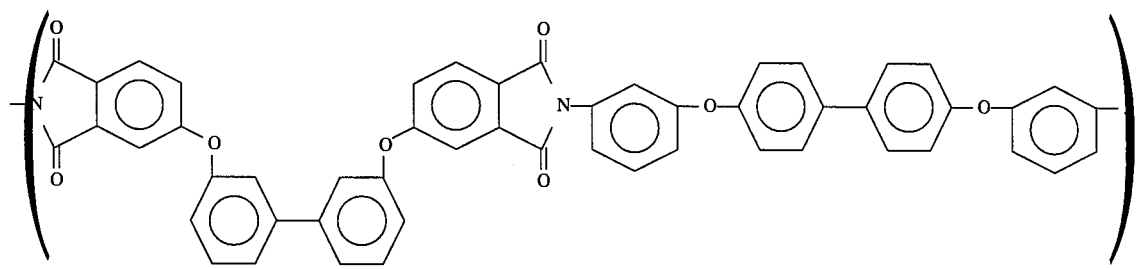

8. An article prepared from the polymer according to claim 1, wherein the article is selected from the group consisting of: a film, a coating and a selective membrane.

9. An article according to claim 8, wherein the article is a film.

* * * * *